(12) United States Patent
Abe et al.

(10) Patent No.: US 7,722,423 B2
(45) Date of Patent: May 25, 2010

(54) METHOD OF MANUFACTURING PLASMA DISPLAY PANEL WITH CONCAVE BARRIER WALL PORTION

(75) Inventors: Takayuki Abe, Osaka (JP); Yoshiyasu Honma, Osaka (JP); Tomohiro Okumura, Osaka (JP); Kaisuke Okada, Osaka (JP); Kazuto Fukuda, Osaka (JP)

(73) Assignee: Panasonic Corporation, Osaka (JP)

( * ) Notice: Subject to any disclaimer, the term of this patent is extended or adjusted under 35 U.S.C. 154(b) by 397 days.

(21) Appl. No.: 11/762,879

(22) Filed: Jun. 14, 2007

(65) Prior Publication Data

US 2007/0292634 A1   Dec. 20, 2007

(30) Foreign Application Priority Data

Jun. 14, 2006   (JP)   ............................. 2006-164288

(51) Int. Cl.
*H01J 9/00* (2006.01)
(52) U.S. Cl. ........................................................ 445/23
(58) Field of Classification Search ............. 445/23–25; 430/321, 320; 313/528–587
See application file for complete search history.

(56) References Cited

FOREIGN PATENT DOCUMENTS

| JP | 2003-303550 A | 10/2003 |
|---|---|---|
| JP | 2006-085917 | 3/2006 |

*Primary Examiner*—Joseph L Williams
(74) *Attorney, Agent, or Firm*—RatnerPrestia

(57) ABSTRACT

A plasma display panel (PDP) and a method of manufacturing the same suppresses variation in the height of the intersecting barrier walls with a simple method and that prevents cross talk from occurring between the discharge cells. A concave part is formed at a position contacting an intersecting part of a first barrier wall before baking and a second barrier wall before baking orthogonal to the first barrier wall before baking. When such concave part is formed, the values of the surface area per volume of the intersecting part and the surface area per volume of the first barrier wall before baking and the second barrier wall before baking between the intersecting part and the intersecting part adjacent to the intersecting part become substantially equal. As a result, the height of the intersecting part does not become high after baking, a barrier wall of aligned height is obtained, and cross talk does not occur between the discharge cells.

16 Claims, 6 Drawing Sheets

METHOD OF MANUFACTURING PLASMA DISPLAY PANEL WITH CONCAVE BARRIER WALL PORTION

BACKGROUND OF THE INVENTION

1. Field of the Invention

The present invention relates to a plasma display panel with barrier walls having an intersecting part, and a method of manufacturing the same.

2. Description of the Related Art

The plasma display panel (hereinafter referred to as "PDP") has a configuration in which the peripheral edges of a front substrate and a rear substrate arranged facing each other are sealed by a sealing member, where discharging gas such as neon (Ne) and xenon (Xe) is enclosed in a discharging space formed between the front substrate and the rear substrate.

The front substrate includes a plurality of display electrodes including scanning electrodes and maintaining electrodes formed in a stripe form on one surface of a glass substrate, and dielectric layer and protective film covering the display electrodes. The display electrodes are each configured by a transparent electrode and a bus electrode made of metal material formed on the transparent electrode.

The rear substrate includes a plurality of address electrodes formed in a stripe form in a direction orthogonal to the display electrodes on one surface of the glass substrate, a base dielectric layer for covering the address electrodes, a barrier wall (rib) of grid form for partitioning the discharging space, and phosphor layers of red, green, and blue sequentially applied to a grooves between the barrier walls.

The display electrodes and the address electrodes are orthogonal to each other, and the orthogonal region becomes the discharging cell. The discharging cells are arranged in matrix form, where three discharging cells including the phosphor layers of red, green, and blue lined in the extending direction of the display electrodes become pixels for color display. The PDP generates gas discharge by sequentially applying a predetermined voltage between the scanning electrode and the address electrode and between the scanning electrode and the maintaining electrode, excites the phosphor layers with the ultraviolet ray generated by gas discharge, and displays the color image by light emission.

A grid form configuration in which luminance and light emitting efficiency is enhanced as the application area of the phosphor increases is adopted for the barrier wall. Such grid form barrier wall is configured by vertical ribs parallel to the address electrodes and horizontal ribs orthogonal to the vertical ribs, and is formed by baking low melting point glass paste.

However, the intersecting parts at where the vertical ribs and the horizontal ribs are orthogonal to each other create a gap with the front substrate since the height of the baked barrier wall becomes higher than the non-intersecting part between the intersecting parts, whereby the remaining charged particles after discharge move to the adjacent discharge cells and cause crosstalk.

In order to solve such problem, a method of arranging a step pattern that sandwiches the non-intersecting part of the barrier wall to reduce the contacting area with air of the non-intersecting part of the barrier wall, aligning the free surface of the intersecting part and the non-intersecting part of the barrier wall to equalize the surface tension that acts on each part of the barrier wall, and aligning the height of the barrier wall has been proposed. Unexamined Japanese Patent Publication No. 2006-85917 is known by way of example.

SUMMARY OF THE INVENTION

In order to solve the above problem, the present invention proposes a method of manufacturing a PDP of arranging a first substrate formed with a first electrode and a dielectric layer on a first glass substrate, and a second substrate formed with a second electrode, a barrier wall, and phosphor layers on a second glass substrate facing each other; where the barrier wall is formed by patterning glass paste to a shape to become a first barrier wall and a second barrier wall orthogonal to the first barrier wall, and to a shape including a concave part in at least one of an intersecting part at where the first and second barrier walls intersect or a position contacting the intersecting part on the second glass substrate formed with the second electrode, and baking the glass paste.

When the glass paste is baked, the organic binder contained in the glass paste is removed, and contracted. Thus, if the barrier wall is formed through the above method, the intersecting part also receives heat sufficiently, is baked, and contracted when the glass paste is baked in a baking furnace and the like since the concave part increases the surface area of the intersecting part of the barrier wall. As a result, the organic binder in the glass paste of the intersecting part is also adequately removed, whereby the intersecting part does not become high, and cross talk does not occur between the discharge cells. Furthermore, since such concave part is collectively patterned when forming the barrier wall, the number of steps will not increase. "Intersect" in the attached document in relation to the present patent application does not only include a state in which the barrier walls cross each other at right angles, but also includes states in which the barrier walls cross each other at other angles. The intersecting part of the barrier wall refers to the portion at where the barrier walls overlap.

In the method of manufacturing the PDP of the present invention, the size of the concave part may be a size a surface area per volume of the intersecting part and a surface area per volume of the first barrier wall before baking and the second barrier wall before baking between the intersecting part and an intersecting part adjacent to the intersecting part are the same.

Since received heat in time of baking the barrier wall depends on heat transfer by convection, the amount of received heat of each part that is to become the barrier wall is proportional to the surface area thereof. Furthermore, since thermal contraction is proportional to the amount of organic binder, that is, the volume to be removed from each part, the height of the barrier wall can be aligned without increasing the height of the intersecting part by setting the values of the surface area per volume of the first barrier wall before baking and the second barrier wall before baking between the intersecting parts to be the same. Here, when referring to having the values of the surface area per volume the same, this does not mean that the height of the barrier wall is aligned only when the values are exactly the same, but means that the effect of the present invention can be exerted when the values approach the same value.

In the method of manufacturing the PDP of the present invention, a width of the concave part in a direction orthogonal to the barrier wall is smaller than a width of a top of the barrier wall before baking If such concave part is arranged at the barrier wall before baking, the surface area of the intersecting part can be increased, and the width of the concave part can be made smaller than the width of the barrier wall, and thus a gap formed by the concave part is not formed between the discharge cells.

In the method of manufacturing the PDP of the present invention, a width of the concave part in a direction orthogonal to the barrier wall is not less than 60% and not more than 80% of the width of the top of the barrier wall before baking, a depth of the concave part is not less than 30% and not more than 60% of a depth of the top of the barrier wall before baking, and a width of the concave part in the direction parallel to the barrier wall is not less than 5 µm and not more than 10 µm.

When the concave part having the size of such range is formed in the barrier wall before baking, the height of the barrier wall can be especially well aligned without the height of the intersecting part becoming high.

In the method of forming the PDP of the present invention, the formation of the concave part includes the steps of applying and drying the glass paste on the second glass substrate, laminating a dry film on the glass paste, forming a predetermined opening pattern by exposing and developing the laminated dry film, blasting polishing agent on the glass paste through the opening pattern and removing the glass paste and forming; and the opening pattern forming the dry film may be formed to have an opening smaller than an average particle diameter of the polishing agent.

According to such method of forming the concave part, since only the polishing agent having a particle diameter smaller than the size of the of the opening enters the opening smaller than the average particle diameter of the polishing agent, grinding can only be performed to be shallower than the opening to which the polishing agent greater than the average particle diameter enters. Thus, the opening of the desired depth can be formed by appropriately selecting the average particle diameter of the polishing agent.

In the method of manufacturing the PDP of the present invention, the depth of the concave part is the same as the height of the barrier wall before baking.

Such concave part does not produce steps at the height of the intersecting part, and thus can be easily formed with a sandblasting process of grinding with polishing agent, or screen printing.

A PDP of the present invention is a display panel in which a first substrate formed with a first electrode and a dielectric layer on a first glass substrate, and a second substrate formed with a second electrode, a first barrier wall, a second barrier wall intersecting the first barrier wall, and phosphor layers on a second glass substrate are arranged facing each other; where a depressed region is formed in at least one of the first barrier wall or the second barrier wall to be smaller than the width of the top of the first and the second barrier wall, and near an intersecting part of the first barrier wall and the second barrier wall.

Since such PDP merely has a depressed region smaller than the width of the top at the vicinity of the intersecting part of the barrier wall, the discharge cells do not connect by way of a gap, and cross talk does not occur between the discharge cells.

DETAILED DESCRIPTION OF THE PREFERRED EMBODIMENT

The PDP and the method of manufacturing the same according to the embodiments of the present invention will now be described using the drawings.

First Embodiment

Figure 1:
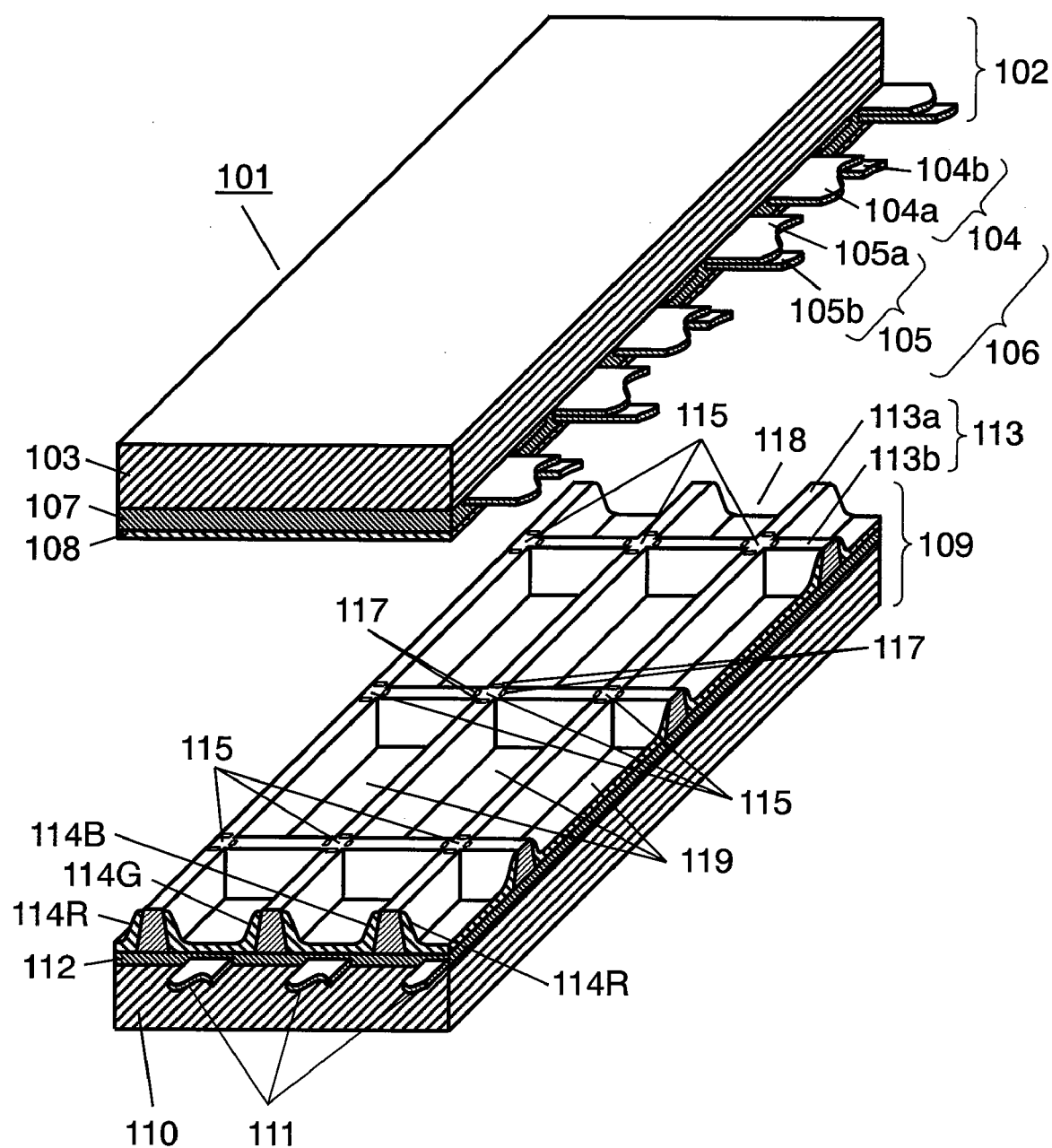
FIG. 1 shows a perspective cross sectional view showing the main parts of the PDP according to a first embodiment of the present invention.

FIG. 1 shows a perspective cross sectional view showing the main parts of the PDP according to the first embodiment of the present invention.

Front plate 102, which is the first substrate, of PDP 101 includes display electrode 106 or a first electrode, consisting of a scanning electrode and maintaining electrode 105, formed on one main surface of glass substrate 103, which is a first glass substrate having transparency and insulation property such as glass; dielectric layer 107 that covers display electrode 106; and protective film 108 made of MgO and the like that covers dielectric layer 107. Scanning electrode 104 and maintaining electrode 105 have a configuration in which bus electrodes 104b, 105b made of metal material such as silver Ag is stacked on transparent electrode 104a, 105a to reduce electrical resistance.

Rear plate 109, which is a second substrate, includes address electrode 111 or a second electrode formed on one main surface of glass substrate 110, which is a second glass substrate having insulation property such as glass; base dielectric layer 112 that covers address electrode 111; barrier wall 113 including first barrier wall 113a formed on base dielectric layer 112 and second barrier wall 113b intersecting first barrier wall 113a; and phosphor layers 114R, 114G, and 114B that cover the grooves between barrier walls 113.

Region 117 depressed smaller than the width of the top of first and second barrier walls 113a and 113b is formed on first barrier wall 113a and second barrier wall 113b near an intersecting part 115 at where first barrier wall 113a and second barrier wall 113b intersect.

Front plate 102 and rear plate 109 are arranged facing each other so that display electrodes 106 and address electrodes 111 become orthogonal to each other with barrier wall 113 in between, and the periphery outside the image display region is sealed by a sealing member (not shown). A discharge gas of 10% of Ne—Xe and the like is enclosed in a discharge space 118 formed between front plate 102 and rear plate 109 at a pressure of 66.5 kPa (500 Torr). The region of discharge space 118 in which display electrodes 106 and address electrodes 111 becomes orthogonal and is surrounded by barrier wall 113 acts as discharge cell (unit in light emitting region) 119.

The method of manufacturing PDP 101 described above will now be described with reference to FIG. 1.

Regarding front plate 102, scanning electrodes 104 and maintaining electrodes 105 are first formed on glass substrate 103. Specifically, a film made of ITO and the like is formed on glass substrate 103 through film forming process such as deposition or sputtering, and thereafter, transparent electrodes 104a, 105a are formed by patterning through photolithography method and the like. A film made of Ag and the like is further formed thereon through film forming process such as deposition or sputtering, and thereafter, bus electrodes 104b, 105b are formed by patterning through photolithography method and the like. Display electrode 106 consisting of scanning electrode 104 and maintaining electrode 105 is thereby obtained.

Display electrodes 106 formed in the above manner are then covered by dielectric layer 107. Dielectric layer 107 is formed by applying paste containing glass material through screen printing and the like, and then baking the same. Dielectric layer 107 formed in such manner is then covered by metal oxide such as protective film 108 made of MgO.

Regarding rear plate 109, address electrode 111 is formed on glass substrate 110. Specifically, film made of Ag material and the like is formed on glass substrate 110 through film forming process such as deposition or sputtering, and thereafter, address electrode 111 is formed by patterning through photolithography method and the like. Address electrode 111 is covered by base dielectric layer 112, and then barrier wall 113 is formed.

Phosphor layers 114R, 114G, and 114B constituted by phosphor particles of red, green, and blue are formed in the grooves between barrier walls 113. Specifically, paste phosphor ink including phosphor particle of each color and organic binder is applied, and then baked to destroy the organic binder, thereby bonding each phosphor particles and forming phosphor layers 114R, 114G, and 114B.

Front plate 102 and rear plate 109 formed as above are overlapped so that display electrodes 106 of front plate 102 and address electrodes 111 of rear plate 109 become orthogonal, the sealing member including sealing glass is inserted to the peripheral edges, and baking is carried out to seal with an air tight sealing layer (not shown). Once the inside of the discharge space 118 is exhausted to high vacuum, the discharge gas (e.g., inactive gas of He—Xe, Ne—Xe) is enclosed at a predetermined pressure to form PDP 101.

Figure 2A:
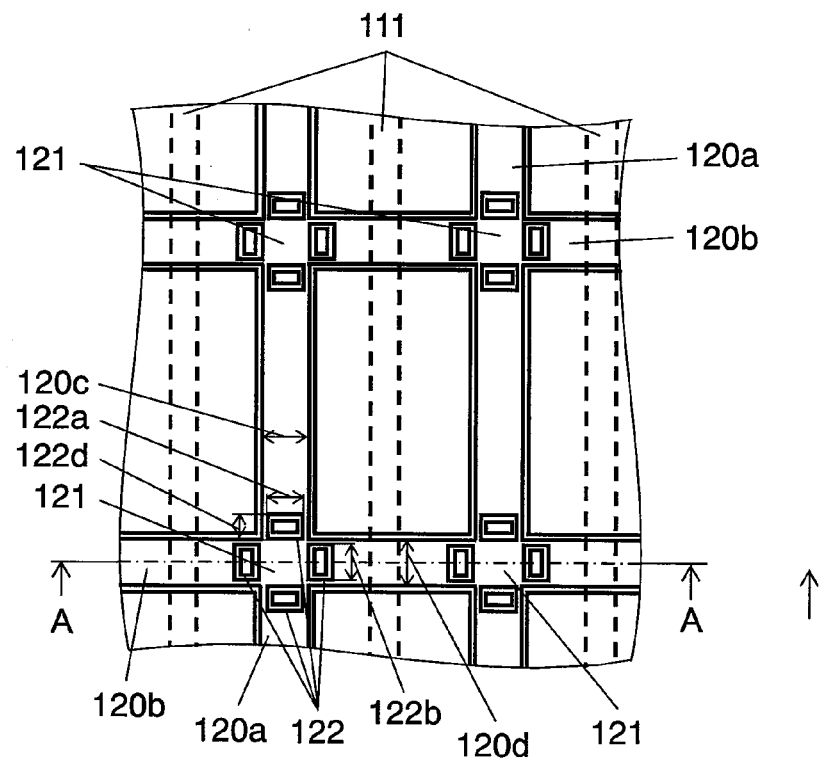
FIG. 2A shows a partial plan view showing the shape of the barrier wall before baking the PDP of the first embodiment of the present invention.

The configuration of barrier wall 113 and PDP 101 described above, as well as the manufacturing method will be described in further detail below. FIG. 2A shows a partial plan view showing the shape of the barrier wall before baking the PDP of the first embodiment of the present invention, FIG. 2B shows a cross sectional view taken along line A-A of FIG. 2A, and FIG. 2C shows a cross sectional view of after the barrier wall of FIG. 2B is baked.

Figure 2B:
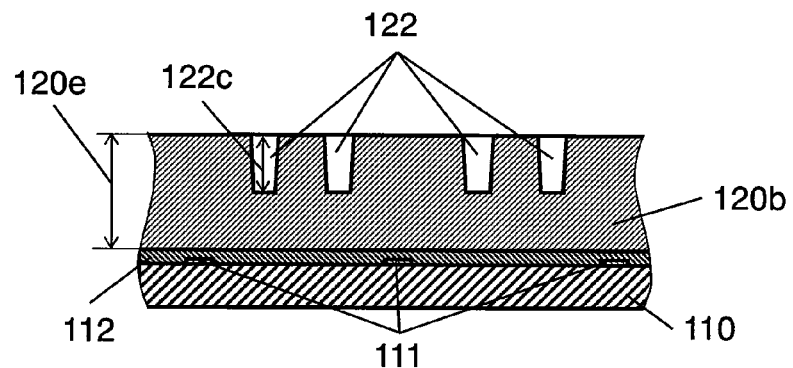
FIG. 2B shows a cross sectional view taken along line A-A of FIG. 2A.
Figure 2C:
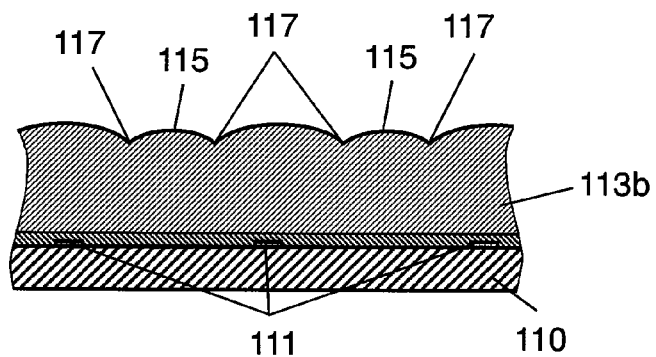
FIG. 2C shows a cross sectional view of after the barrier wall of FIG. 2B is baked.

Concave part 122 is arranged at a position contacting an intersecting part 121 of first barrier wall 120a before baking and second barrier wall 120b before baking that is orthogonal to first barrier wall 120a before baking, thereby increasing the surface area of intersecting part 121, as shown in FIGS. 2A and 2B. The concave part 122 has a shape of a square pyramid with tip part removed.

Here, width 122a of the concave part in the direction orthogonal to the barrier wall is set smaller than width 120c of the top of first barrier wall 120a before baking. If width 122a of the concave part is the same as width 120c of the top of the first barrier wall before baking, crosstalk sometimes occurs from concave part 122. However, if width 122a of the concave part is set smaller than width 120c of the top of the first barrier wall before baking, a gap does not form in first barrier wall 113a after baking, and thus crosstalk does not occur. Similarly, width 122b of the concave part in a direction orthogonal to the barrier wall of concave part 122 arranged in second barrier wall 120b before baking is set smaller than width 120d of the top of second barrier wall 120b before baking.

In particular, in barrier wall 133 of grid form configuration, width 122a of the concave part and width 122b of the concave part in the direction orthogonal to the barrier wall are respectively set to not less than 60% and not more than 80% of width 120c of the top of first barrier wall 120a before baking and width 120d of the top of second barrier wall 120b before baking. Depth 122c of the concave part is set to not less than 30% and not more than 60% of barrier wall height 120e before baking, which is the height of first barrier wall 120a before baking and second barrier wall 120b before baking. Furthermore, length 122d of concave part, which is the width in the direction parallel to the barrier wall of concave part 122, is preferably set to not less than 5 µm and not more than 10 µm.

For instance, if width 120c of the top of the first barrier wall before baking is 50 µm, barrier wall height 120e before baking is 100 µm, and the length between intersecting part 121 and the intersecting part adjacent to intersecting part 121 is 200 µm, width 122a of the concave part is formed to be not less than 30 µm and not more than 40 µm, length 122d of the concave part to be not less than 5 µm and not more than 10 µm, and depth 122c of the concave part to be not less than 30 µm and not more than 60 µm.

When such concave part 122 is formed, the values of the surface area per volume of intersecting part 121 and the surface area per volume of first barrier wall 120a before baking and second barrier wall 120b before baking between intersecting part 121 and the intersecting part adjacent to the intersecting part become substantially equal. If the values of the surface area per volume are made equal, first barrier wall 120a before baking and second barrier wall 120b before baking between intersecting part 121 and the intersecting part adjacent to intersecting part 121 also have substantially the same heat receiving amount during baking and the amount of organic binder contained in the glass paste to be removed.

In consequence, depressed region 117 is formed in the vicinity of intersecting part 115 as shown in FIG. 2C, but second barrier wall 113b becomes the barrier wall having aligned height without the height of intersecting part 115 becoming higher. Similar to second barrier wall 113b, first barrier wall 113a has an aligned height including intersecting part 115, and crosstalk does not occur between the discharge cells.

The shape of concave part 122 deforms with heat contraction during baking of the barrier wall, and becomes depressed region 117 after baking.

Figure 3A:
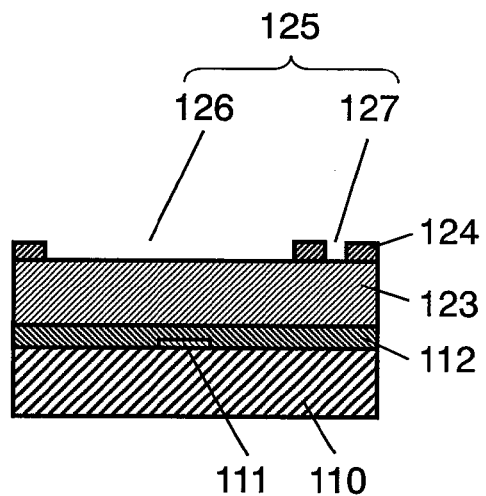
FIG. 3A shows a frame format cross sectional view before sandblasting process describing the formation of the barrier wall before baking of the PDP of the first embodiment of the present invention.
Figure 3B:
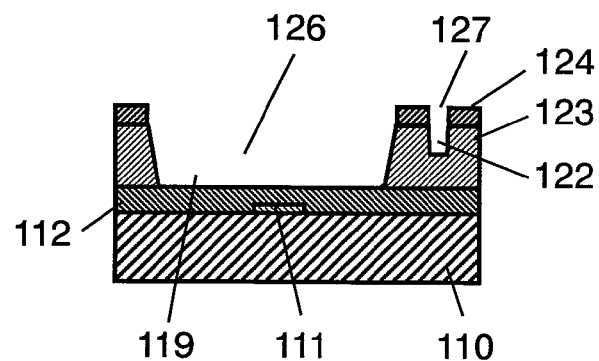
FIG. 3B shows a frame format cross sectional view after sandblasting process describing the formation of the barrier wall before baking of the PDP of the first embodiment of the present invention.

The process of forming first barrier wall 120a before baking and second barrier wall 120b before baking formed with concave part 122 through sandblasting process will now be described using FIG. 3. FIG. 3 shows a frame format cross sectional view describing the formation of the barrier wall before baking of the PDP of the first embodiment of the present invention, where FIG. 3A shows the state before sandblasting process and FIG. 3B shows the state after the sandblasting process.

First, a glass paste constituted with aggregate such as silicon dioxide ($SiO_2$) for glass frit or the barrier wall material, ethyl cellulose resin for the organic binder component, terpineol for the solvent, and dibutylphthalate for the plasticizer is prepared. The glass paste is applied to glass substrate 110 or the second glass substrate formed with address electrode 111 or the second electrode and base dielectric layer 112 through die coating method at a film thickness of 100 μm to 250 μm, heated at 70° C. to 150° C. and dried to form glass paste layer 123, as shown in FIG. 3A.

Dry film 124 having a film thickness of 20 μm to 50 μm is laminated on dried glass paste layer 123 while being heated at 70° C. to 120° C. In this case, the adhesiveness of glass paste layer 123 and dry film 124 is enhanced if glass substrate 110 is preliminarily heated for five to ten minutes at 80° C. to 100° C. before laminating.

Dry film 124 is exposed (exposure amount: 100 $mJ/cm^2$ to 500 $mJ/cm^2$) through the photomask, developed with alkaline aqueous solution (e.g., 0.5% to 5% of sodium carbonate ($Na_2CO_3$), and formed with predetermined opening pattern 125. Here, opening pattern 125 includes opening 126 that is to become discharge cell 119 and opening 127 having the shape of concave part 122. The width of opening 127 is set smaller than the average particle diameter of the polishing agent to be used in the next step.

Glass paste layer 123 of the portion of opening 126 that is to become discharge cell 119 and opening 127 that is not covered with dry film 124 is scraped and removed, as shown in FIG. 3B, in the sandblasting process of blasting polishing agent to glass paste layer 123. Dry film 123 is then stripped, and finally baked at 450° C. to 600° C. to complete barrier wall 113.

Figure 4:
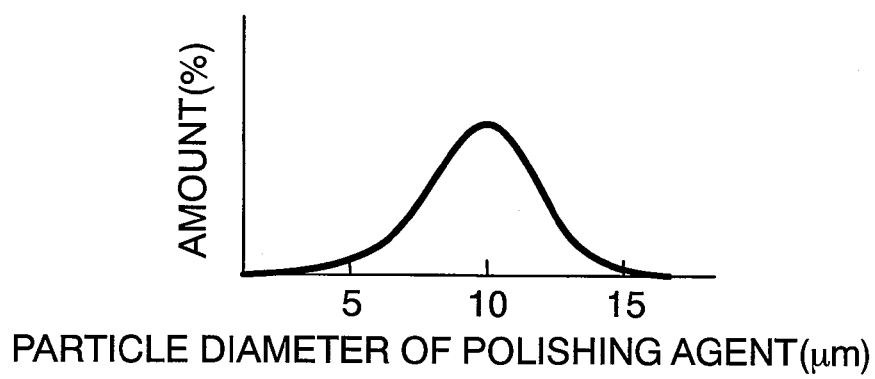
FIG. 4 shows a view showing particle diameter distribution of the polishing agent forming the barrier wall of the PDP of the first embodiment of the present invention.

The reason as to why the portion of discharge cell 119 and concave part 122 having different grinding depth are simultaneously formed will be described below. FIG. 4 shows a view showing particle diameter distribution of the polishing agent forming the barrier wall of the PDP of the first embodiment of the present invention.

The particle diameter of the polishing agent such as calcium carbonate ($CaCO_3$), stainless steel, and the like used in the sandblasting process has a diameter (average particle diameter φ2 μm to 20 μm) smaller than the portion of discharge cell 119 having the size of around 100 μm×200 μm to be removed. The polishing agent generally has a particle diameter distribution, where 50% of the polishing agent having the particle diameter of not more than 10 μm exist when the polishing agent having the average particle diameter 10 μm shown in FIG. 4 is used. Thus, if the width of opening 127 that is to become concave part 122 in dry film 124 is 10 μm, the relevant portion can only be grinded to half the depth compared to opening 126 that is to become discharge cell 119. This is because opening 126 that is to become discharge cell 119 can be grinded with the polishing agent of all particle diameters, whereas opening 127 that is to become concave part 122 can only be grinded with half the polishing agents in terms of particle diameter distribution. Therefore, the size and the grinding depth of required concave part 122 can be set by selecting an appropriate polishing agent of the particle diameter distribution.

Figure 5A:
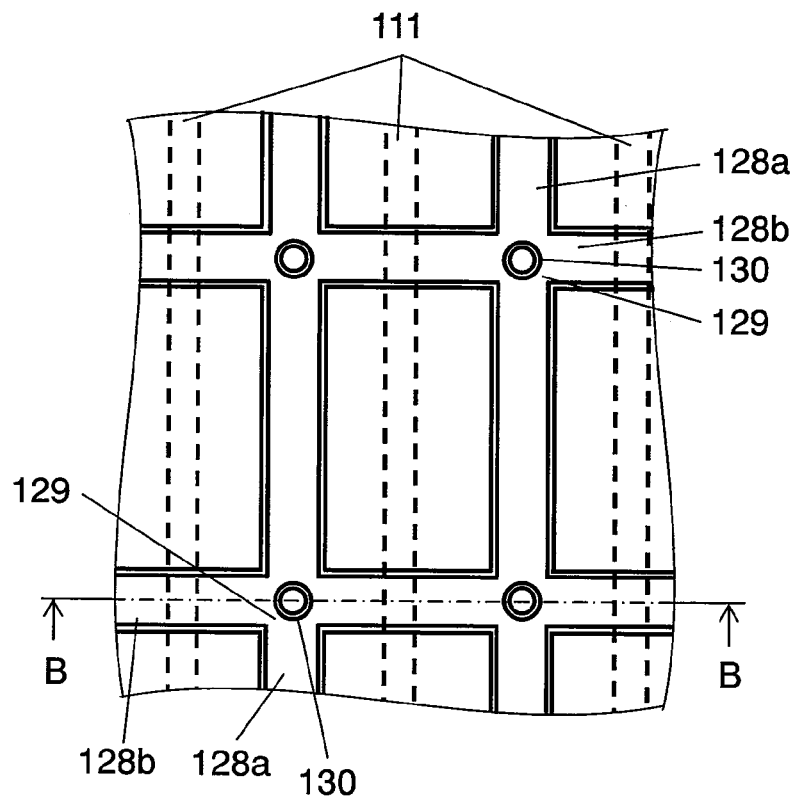
FIG. 5A shows a partial plan view showing a variant of a concave part arranged on the barrier wall before baking of the PDP according to the first embodiment of the present invention.
Figure 5B:
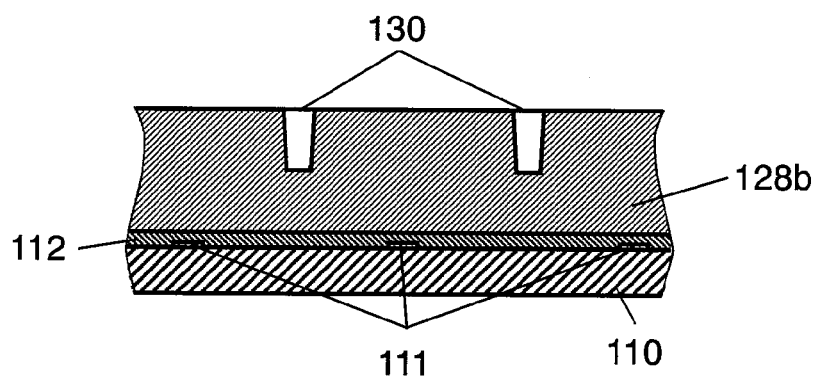
FIG. 5B shows a cross sectional view taken along line B-B of FIG. 5A.

FIG. 5 shows a variant of a concave part arranged on the barrier wall before baking of the PDP according to the first embodiment of the present invention, where FIG. 5A shows a partial plan view showing the shape of the barrier wall before baking and FIG. 5B shows a cross sectional view taken along line B-B of FIG. 5A. Circular concave part 130 is arranged at intersecting part 129 of first barrier wall 128a before baking and second barrier wall 128b before baking orthogonal to first barrier wall 128a before baking. The surface area of intersecting part 129 is increased by arranging circular concave part 130 at intersecting part 129. The heat receiving amounts of first barrier wall 128a before baking and second barrier wall 128b before baking between intersecting part 129 and an intersecting part adjacent to intersecting part 129 are made substantially the same. As a result, the height of the intersecting part after baking also does not become high, and the barrier wall of aligned height is formed.

Note that an example of circular concave part 130 has been illustrated in FIG. 5, but the shape is not limited to circular shape, and a great number of concave parts may be arranged at intersecting part 129.

Concave part 122 of FIG. 2 shows arranged at four regions of intersecting part 121, but the concave part may be arranged only at the barrier wall before baking that has a large width if the widths between first barrier wall 120a before baking and second barrier wall 120b before baking, which intersect each other, greatly differ. In this case as well, the surface area of intersecting part 121 is made sufficiently larger and the surface area per volume of the barrier wall before baking between intersecting part 121 and the adjacent intersecting part is made the same by arranging the concave part only at the barrier wall before baking that has a large width.

Second Embodiment

Figure 6:
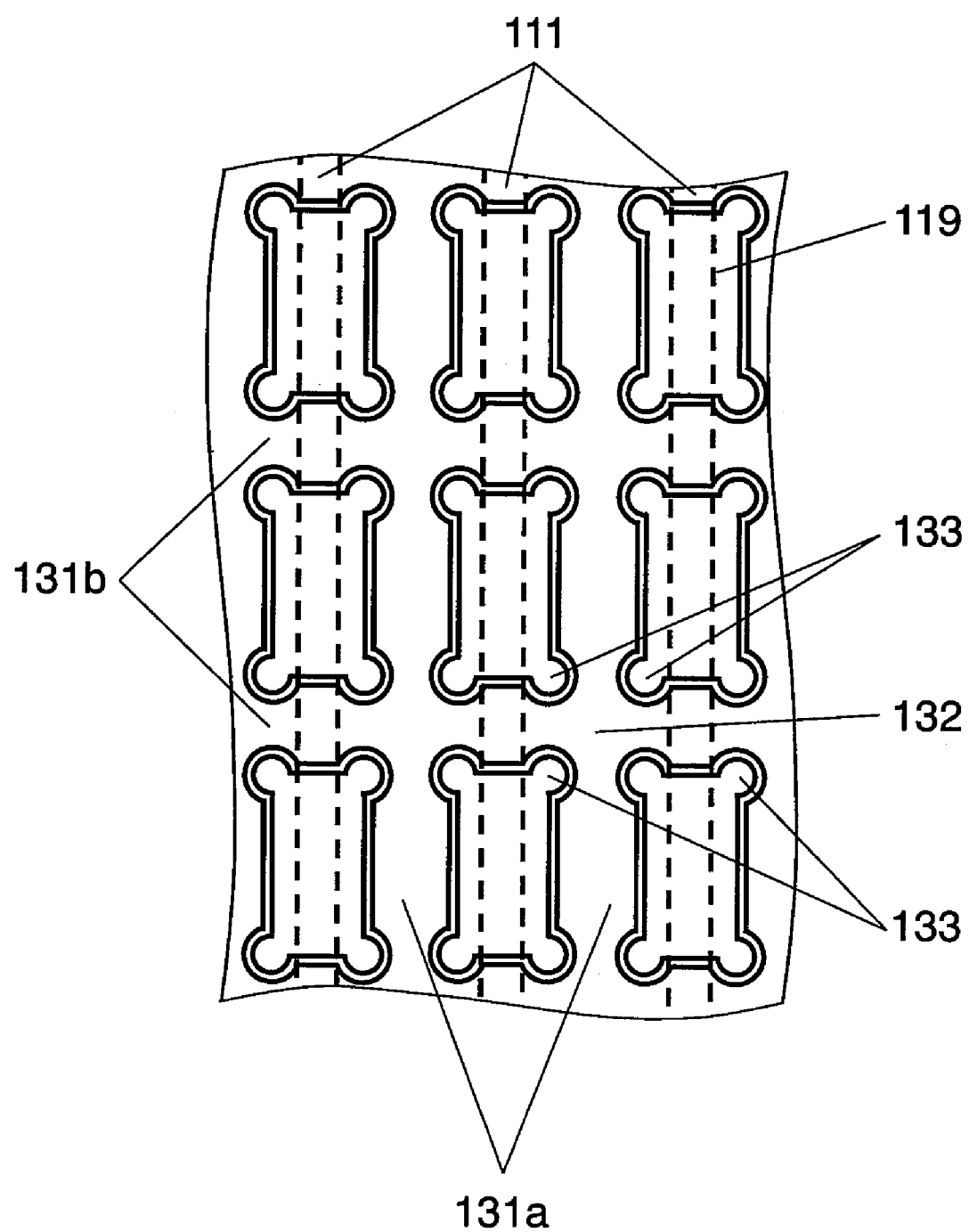
FIG. 6 shows a partial plan view showing the shape of the barrier wall before baking of the PDP according to a second embodiment of the present invention.

FIG. 6 shows a partial plan view showing the shape of the barrier wall before baking of the PDP according to a second embodiment of the present invention. The PDP of the second embodiment of the present invention differs from the PDP of the first embodiment of the present invention only in that the shape of the concave part of the barrier wall before baking is different.

As shown in FIG. 6, partially circular concave part 133 is arranged at intersecting part 132 of first barrier wall 131a before baking and second barrier wall 131b before baking orthogonal to first barrier wall 131a before baking. The depth of partially circular concave part 133 is the same as the height of first barrier wall 131a before baking and second barrier wall 131b before baking. That is, partially circular concave part 133 of the second embodiment of the present invention is not a groove formed with a step with respect to the barrier wall as in the first embodiment, but is formed by scraping off one part of intersecting part 132 from first barrier wall 131a before baking and second barrier wall 131b before baking. The region surrounded by first barrier wall 131a before baking and second barrier wall 131b before baking is discharge cell 119, and address electrode 111 is arranged at the lower part thereof, identical to the PDP of the first embodiment of the present invention. The surface area of intersecting part 132 is thus increased by scraping off one part of intersecting part 132. The size to be scraped off is such that surface area per volume of first barrier wall 131a before baking and second barrier wall 131b before baking between intersecting part 132 and adjacent intersecting part 132 become the same.

The manufacturing method of having a shape in which one part of intersecting part 132 is scraped off may be screen printing in addition to sandblasting process described above, and thus the selection of manufacturing methods becomes wider.

Figure 7:
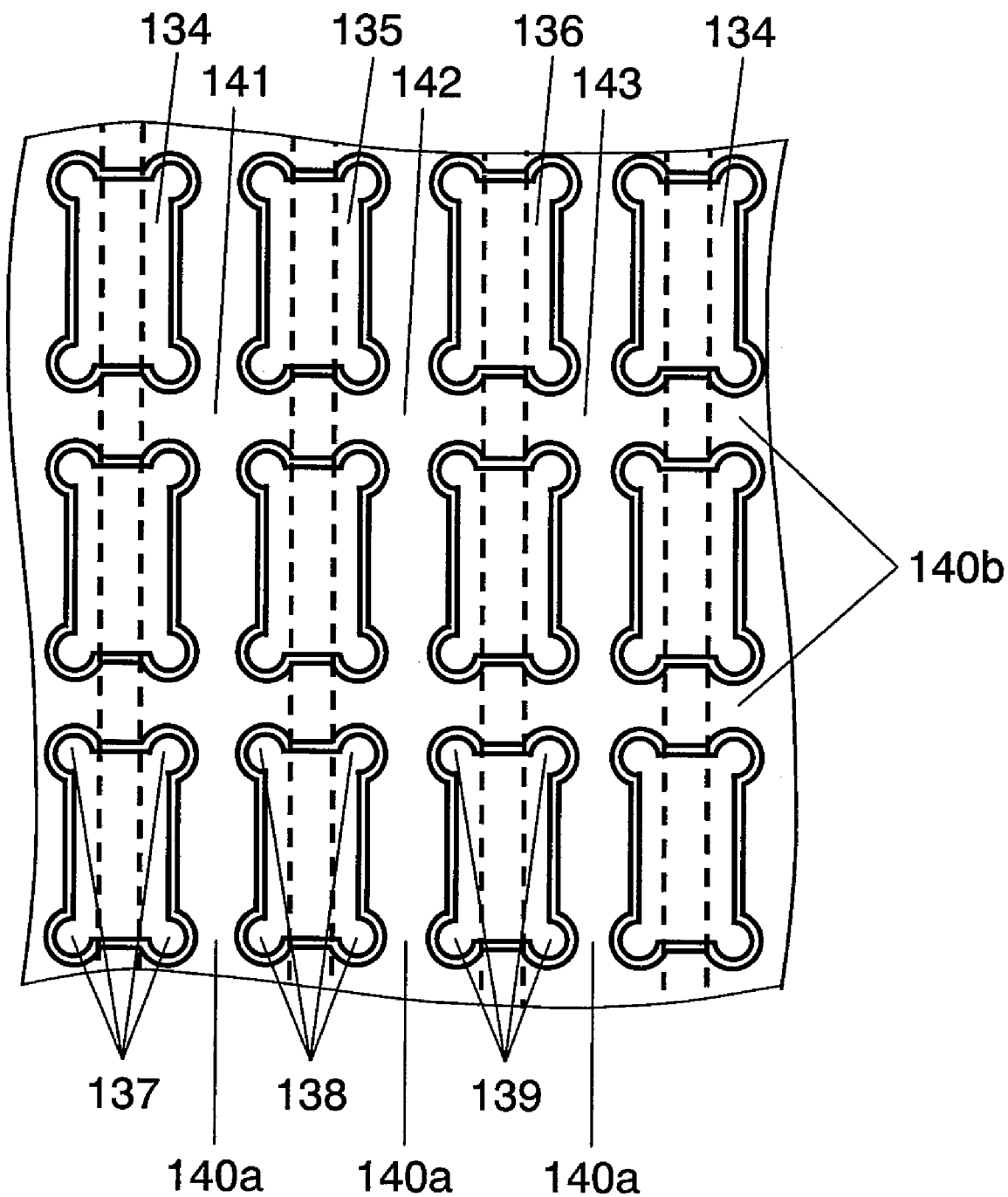
FIG. 7 shows a partial plan view showing the shape of a variant of the barrier wall before baking of the PDP of the second embodiment of the present invention.

FIG. 7 shows a partial plan view showing the shape of a variant of the barrier wall before baking of the PDP according to the second embodiment of the present invention. FIG. 7 shows an example in which the aperture ratio of discharge cells 134, 135, 136 forming the phosphor layers of red, green, and blue is changed for luminance adjustment. For instance, the aperture ratio of discharge cells 134, 135, 136 is discharge cell 135<discharge cell 134<discharge cell 136 for white balance adjustment. The size of concave parts 137, 138, and 139 arranged at the four corners of each discharge cell 134, 135, 136 for obtaining such aperture ratio is concave part 138<concave part 137<concave part 139. Note that the size of the concave part arranged at the four corners of one discharge cell is equal, and the depth of the concave part is the same as the height of first barrier wall 140*a* before baking and second barrier wall 140*b* before baking. Intersecting parts 141, 142, 143 are regions respectively surrounded by discharge cell 134 and discharge cell 135, discharge cell 135 and discharge cell 136, and discharge cell 136 and discharge cell 134.

Furthermore, the size of concave parts 137, 138, 139 is such that the surface areas per volume of first barrier wall 140*a* before baking and second barrier wall 140*b* before baking between the intersecting part and an intersecting part adjacent thereto is the same. For example, the size of concave part 137 is such that the surface area per volume of intersecting part 141 and second barrier wall 140*b* before baking between intersecting part 141 and intersecting part 142, and the surface area per volume of first barrier wall 140*a* before baking between intersecting parts 141 are the same.

As a result, the heat receiving amount of intersecting parts 141, 142, 142 increases, and a state in which only intersecting parts 141, 142, 143 have high barrier wall height will not occur. Since the barrier wall height is aligned, crosstalk will not occur, and the PDP including discharge cells 134, 135, 136 that can be luminance adjusted is obtained.

An example of scraping off the four corners (for regions) of the discharge cell to a partially circular shape is shown in the second embodiment of the present invention, but may be two or three regions as long as it is within the range the surface area per unit volume becomes the same. The shape is not limited to circular shape, and may be scraped off to rectangular shape or polygonal shape.

Furthermore, the barrier wall having an intersecting part of grid form configuration has been explained in the embodiments of the present invention, but is not limited to a configuration in which the barrier walls intersect in cross form. The barrier may have a meander rib configuration, and the present invention is applicable when the barrier walls intersect.

According to the present invention, the PDP in which the barrier wall height of the intersecting portion does not become high and the crosstalk does not occur even in the PDP including intersecting barrier walls and a method of manufacturing the same are provided, and high-definition plasma display and the like can be achieved.

What is claimed is:

1. A method of manufacturing a plasma display panel of arranging a first substrate formed with a first electrode and a dielectric layer on a first glass substrate, and a second substrate formed with a second electrode, a barrier wall, and phosphor layers on a second glass substrate facing each other; wherein
   the barrier wall is formed by patterning glass paste to a shape to become a first barrier wall and a second barrier wall orthogonal to the first barrier wall, and to a shape including a concave part in at least one of an intersecting part at where the first and second barrier walls intersect or a position contacting the intersecting part on the second glass substrate formed with the second electrode, and baking the glass paste.

2. The method of manufacturing the plasma display panel according to claim 1, wherein the size of the concave part is a size a surface area per volume of the intersecting part and a surface area per volume of the first barrier wall before baking and the second barrier wall before baking between the intersecting part and an intersecting part adjacent to the intersecting part are the same.

3. The method of manufacturing the plasma display panel according to claim 1, wherein
   a width of the concave part in a direction orthogonal to the barrier wall is smaller than a width of the top of the barrier wall before baking.

4. The method of manufacturing the plasma display panel according to claim 2, wherein
   a width of the concave part in a direction orthogonal to the barrier wall is smaller than a width of the top of the barrier wall before baking.

5. The method of manufacturing the plasma display panel according to claim 3, wherein
   a width of the concave part in a direction orthogonal to the barrier wall is not less than 60% and not more than 80% of the width of the top of the barrier wall before baking, a depth of the concave part is not less than 30% and not more than 60% of a depth of the top of the barrier wall before baking, and a width of the concave part in the direction parallel to the barrier wall is not less than 5 µm and not more than 10 µm.

6. The method of manufacturing the plasma display panel according to claim 4, wherein
   a width of the concave part in a direction orthogonal to the barrier wall is not less than 60% and not more than 80% of the width of the top of the barrier wall before baking, a depth of the concave part is not less than 30% and not more than 60% of a depth of the top of the barrier wall before baking, and a width of the concave part in the direction parallel to the barrier wall is not less than 5 µm and not more than 10 µm.

7. The method of manufacturing the plasma display panel according to claim 1, wherein
   the formation of the concave part includes the steps of:
   applying and drying the glass paste on the second glass substrate,
   laminating a dry film on the glass paste,
   forming a predetermined opening pattern by exposing and developing the laminated dry film,
   blasting polishing agent on the glass paste through the opening pattern and removing the glass paste and forming; and
   the opening pattern forming the dry film is formed to have an opening smaller than an average particle diameter of the polishing agent.

8. The method of manufacturing the plasma display panel according to claim 2, wherein
   the formation of the concave part includes the steps of:
   applying and drying the glass paste on the second glass substrate,
   laminating a dry film on the glass paste,
   forming a predetermined opening pattern by exposing and developing the laminated dry film,
   blasting polishing agent on the glass paste through the opening pattern and removing the glass paste and forming; and
   the opening pattern forming the dry film is formed to have an opening smaller than an average particle diameter of the polishing agent.

9. The method of manufacturing the plasma display panel according to claim 3, wherein the formation of the concave part includes the steps of:
applying and drying the glass paste on the second glass substrate,
laminating a dry film on the glass paste,
forming a predetermined opening pattern by exposing and developing the laminated dry film,
blasting polishing agent on the glass paste through the opening pattern and removing the glass paste and forming; and
the opening pattern forming the dry film is formed to have an opening smaller than an average particle diameter of the polishing agent.

10. The method of manufacturing the plasma display panel according to claim 4, wherein
the formation of the concave part includes the steps of:
applying and drying the glass paste on the second glass substrate,
laminating a dry film on the glass paste,
forming a predetermined opening pattern by exposing and developing the laminated dry film,
blasting polishing agent on the glass paste through the opening pattern and removing the glass paste and forming; and
the opening pattern forming the dry film is formed to have an opening smaller than an average particle diameter of the polishing agent.

11. The method of manufacturing the plasma display panel according to claim 5, wherein
the formation of the concave part includes the steps of:
applying and drying the glass paste on the second glass substrate,
laminating a dry film on the glass paste,
forming a predetermined opening pattern by exposing and developing the laminated dry film,
blasting polishing agent on the glass paste through the opening pattern and removing the glass paste and forming; and
the opening pattern forming the dry film is formed to have an opening smaller than an average particle diameter of the polishing agent.

12. The method of manufacturing the plasma display panel according to claim 6, wherein
the formation of the concave part includes the steps of:
applying and drying the glass paste on the second glass substrate,
laminating a dry film on the glass paste,
forming a predetermined opening pattern by exposing and developing the laminated dry film,
blasting polishing agent on the glass paste through the opening pattern and removing the glass paste and forming; and
the opening pattern forming the dry film is formed to have an opening smaller than an average particle diameter of the polishing agent.

13. The method of manufacturing the plasma display panel according to claim 1, wherein the depth of the concave part is the same as the height of the barrier wall before baking.

14. The method of manufacturing the plasma display panel according to claim 2, wherein the depth of the concave part is the same as the height of the barrier wall before baking.

15. The method of manufacturing the plasma display panel according to claim 3, wherein the depth of the concave part is the same as the height of the barrier wall before baking.

16. The method of manufacturing the plasma display panel according to claim 4, wherein the depth of the concave part is the same as the height of the barrier wall before baking.

* * * * *